(No Model.)
A. S. DAVY.
PROTECTOR FOR PNEUMATIC TIRES.
No. 517,033. Patented Mar. 27, 1894.
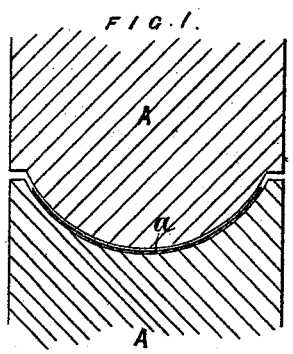
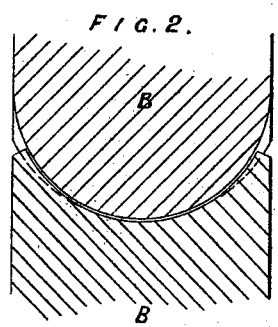
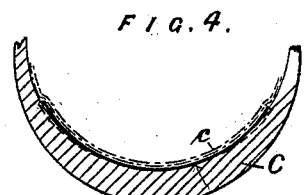
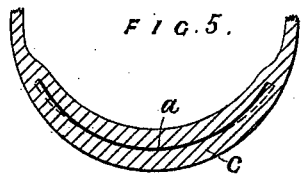
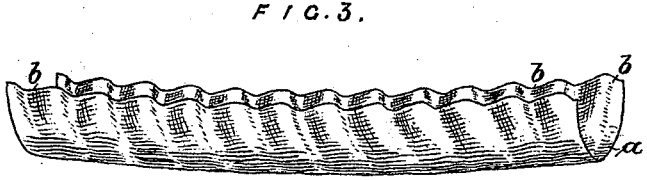
WITNESSES
Charles E. Smith
Otto Schrenk
INVENTOR
Alfred South Davy,
BY
Briesen & Knauth
ATTORNEYS.

UNITED STATES PATENT OFFICE.

ALFRED SOUTH DAVY, OF SHEFFIELD, ENGLAND.

PROTECTOR FOR PNEUMATIC TIRES.

SPECIFICATION forming part of Letters Patent No. 517,033, dated March 27, 1894.

Application filed August 12, 1893. Serial No. 482,985. (No model.)

*To all whom it may concern:*

Be it known that I, ALFRED SOUTH DAVY, manager of steel-works, of 2 Peel Terrace, Wilkinson Street, Sheffield, in the county of York, England, have invented a new and useful Improved Protector for Pneumatic Tires, of which the following is a full, clear, and exact description.

My invention has for its object to provide means whereby the puncturing of the air tubes of pneumatic tires may be effectually prevented and the invention consists essentially in rendering the tire non-perforable by introducing between the air tube and the outer sheath or cover, or by embedding in the thickness of the sheath itself, a thin ribbon preferably of tempered steel, which has been curved both transversely and in the direction of its length to suit the transverse and circumferential curvature of the tire as hereinafter described. The strip is of sufficient breadth to protect the tread and vulnerable portion of the tire and the two-fold curvature above referred to is imparted to it by contracting the strip at the edges and to a gradually diminishing extent toward the center. This contraction of the marginal portion of the strip is effected by forming therein transverse corrugations extending from each edge and tapering off or diminishing gradually toward the center of the strip. In any case the ribbon or strip if of steel is operated on when in the soft state and would be subsequently hardened and tempered to give the necessary elasticity and resistance to penetration, but other metals than steel may be employed.

The accompanying drawings illustrate on an enlarged scale the nature of the invention and the means employed in producing the same wherein—

Figure 1 is a section of a part of a pair of plain rolls with curved faces for giving the transverse curvature to the strip. Fig. 2 is a section of part of a pair of corrugating rolls. Fig. 3 is a perspective view of part of the finished strip. Figs. 4 and 5 are cross sections of the tire showing the position of the strip therein.

The combined longitudinal and transverse curvature may be imparted to the strip *a* at one operation by passing it between a pair of corrugating rolls B of the form shown in Fig. 2, or it may first be passed between a plain pair of rolls A such as shown in Fig. 1 to give it the desired transverse curvature and then, through the corrugating rolls B Fig. 2 suitable guiding devices (not shown) being of course provided to prevent the strip from deviating from its proper position in passing between the rolls. By its passage through the rolls B shown in Fig. 2 the strip is corrugated as shown in Fig. 3 with corrugations *b* extending from each edge inward toward the middle of the strip, the corrugations diminishing in depth from the edges inward and dying out or merging with the normal surface of the strip at or before reaching the center of the width of the strip. The depth and pitch of these corrugations are proportional to the difference of radius of the edge of the strip and the middle of the strip when curved transversely and longitudinally to the form and diameter of the wheel tire.

Without in any way limiting myself to actual dimensions, it may be mentioned that it is proposed to use for a wheel of a diameter of thirty inches (equal to seventy-five centimeters) ribbed steel (similar to that used for making pens) about one and one-half inches (equal to thirty-eight millimeters) wide, .003 of an inch (equal to .076 millimeter) thick, and the depth of the corrugations at the extreme edges being about .0625 inch (equal to 1.58 millimeters) and their "pitch" being about .125 inch (equal to 3.16 millimeters.) The strip having been brought to the corrugated form as shown, is then hardened and tempered in the ordinary way of tempering such goods. Supposing the strip *a* is to be applied to the inner surface of the sheath C as shown in Fig. 4, it would be covered on the inner face by one or more strips of rubber coated canvas *c* of greater width than the metal strip *a*, so that the edges of the canvas extend beyond those of the metal strip and be cemented to the inner surface of the sheath C both to prevent the inner air tube (not shown) from coming into contact with the metal strip *a* and to retain the latter securely in position. The ends of the strip *a* would merely overlap a short distance, their corrugations fitting into each other without being otherwise united. The strip *a* may be applied to the inner surface of the sheath C, after or in course of manufacture of said sheath. In the latter case the canvas covering c would be first applied to the core on which the sheath is to be molded, then the metal sheath a, and finally the sheath C would be built up or molded thereon in the ordinary way and vulcanized with the strip in position therein. If the strip is to be embedded in the thickness of the sheath, as shown in Fig. 5, it would be built up or molded in a similar manner.

Although I have spoken of applying the strip a in the sheath C forming the outer cover for the air tube, supposing one to be used, the use of an inner air tube is not necessary if means be provided for closing the sheath C airtight in which case C would be the inflated tire itself. Such means for closing the sheath C and dispensing with an inner air tube are not shown and described, being already known and therefore forming no part of this invention.

Having now particularly described and ascertained the nature of my said invention and in what manner the same is to be performed, I declare that what I claim is—

1. A protector for pneumatic tires, of a ribbon of metal, curved both transversely and longitudinally and having transverse corrugations extending from the edges and gradually diminishing in depth to zero at the middle, as and for the purpose specified.

2. The combination with a pneumatic tire of a ribbon of metal curved transversely and longitudinally and having transverse corrugations of gradually diminishing depth from the edges inward and applied to the inner surface of, or embedded in, the thickness of the tire, substantially as specified.

Dated this 26th day of July, 1893.

ALFRED SOUTH DAVY.

Witnesses:
 JNO. GEO. ASH,
 WILLIAM IRVING,
*Clerks with Messrs. Moorehead, Wightman & Moore, Solicitors, Sheffield.*